(12) United States Patent
Taylor

(10) Patent No.: US 8,051,830 B2
(45) Date of Patent: Nov. 8, 2011

(54) TWO-STROKE UNIFLOW TURBO-COMPOUND INTERNAL COMBUSTION ENGINE

(76) Inventor: Jack R. Taylor, Cincinnati, OH (US)

( * ) Notice: Subject to any disclaimer, the term of this patent is extended or adjusted under 35 U.S.C. 154(b) by 0 days.

(21) Appl. No.: 12/849,175

(22) Filed: Aug. 3, 2010

(65) Prior Publication Data
US 2011/0030654 A1 Feb. 10, 2011

Related U.S. Application Data

(60) Provisional application No. 61/231,306, filed on Aug. 4, 2009.

(51) Int. Cl.
F02F 1/22 (2006.01)
F02B 31/08 (2006.01)

(52) U.S. Cl. ............. 123/308; 123/65 W; 123/65 P

(58) Field of Classification Search .......... 123/65 WA, 123/65 W, 65 P, 307, 308, 302, 559.1; 60/598
See application file for complete search history.

(56) References Cited

U.S. PATENT DOCUMENTS

| | | | |
|---|---|---|---|
| 1,233,621 A | | 7/1917 | Twombly |
| 1,649,554 A | | 11/1927 | Sweet |
| 1,734,459 A | | 11/1929 | Curtis |
| 2,018,848 A | * | 10/1935 | Gruebler ............ 123/65 BA |
| 2,063,374 A | | 12/1936 | Hansen et al. |
| 2,123,065 A | | 7/1938 | Sass |
| 2,231,392 A | * | 2/1941 | McCarthy ............ 123/307 |
| 2,269,084 A | * | 1/1942 | McCarthy ............ 123/298 |
| 2,483,288 A | | 9/1949 | Malin |
| 2,699,765 A | | 1/1955 | Taylor |
| 2,979,045 A | | 4/1961 | Busch |
| 2,991,616 A | | 7/1961 | Miller |
| 3,494,335 A | | 2/1970 | Meier |
| 4,088,098 A | | 5/1978 | Rose et al. |
| 4,207,843 A | | 6/1980 | List et al. |
| 4,359,027 A | | 11/1982 | Scharpf |
| 4,491,096 A | | 1/1985 | Noguchi et al. |
| 4,625,693 A | | 12/1986 | Trihey |
| 4,671,218 A | * | 6/1987 | Weiland ............ 123/65 V |
| 4,709,683 A | | 12/1987 | Schatz |
| 4,797,070 A | | 1/1989 | Schatz |
| 4,822,242 A | | 4/1989 | Yamazaki |
| 5,072,699 A | * | 12/1991 | Pien ............ 123/65 VC |
| 5,115,788 A | | 5/1992 | Sasaki et al. |

(Continued)

OTHER PUBLICATIONS

Rotax 912 UL DCDI 81H (2 pages.) Printed Nov. 8, 2010. http://www.rotaxservice.com/rotax_engines/rotax_912ULsp.htm.

(Continued)

Primary Examiner — Hai Huynh
(74) Attorney, Agent, or Firm — Hasse & Nesbitt LLC; Daniel F. Nesbitt

(57) ABSTRACT

A reciprocating two-stroke uniflow internal combustion (IC) cylinder and multiple cylinder engine, the cylinder having a cylinder wall and a cylinder head, the cylinder head having an exhaust port, a fuel injector, and a spark means disposed through the cylinder head, a piston reciprocally mounted in the cylinder for movement alternately through compression and power strokes, and a scroll plenum extending unidirectional around the outside of the cylinder wall and having an inlet and a plurality of swirl ports disposed through the cylinder wall providing fluid communication from the scroll plenum into the cylinder chamber, wherein the plurality of swirl ports enter the cylinder chamber tangentially with respect to the axial centerline of the cylinder, and wherein the plurality of swirl ports are subject to opening and closing in response to movement of said piston.

15 Claims, 12 Drawing Sheets

U.S. PATENT DOCUMENTS

| | | | |
|---|---|---|---|
| 5,134,976 A * | 8/1992 | Towner et al. | 123/65 PE |
| 5,435,283 A | 7/1995 | Zehr | |
| 5,477,838 A * | 12/1995 | Schlunke et al. | 123/559.1 |
| 5,517,954 A * | 5/1996 | Melchior | 123/65 W |
| 6,101,990 A | 8/2000 | Green | |
| 6,848,416 B1 | 2/2005 | Pien | |
| 7,114,485 B2 | 10/2006 | Pien | |
| 7,240,491 B2 | 7/2007 | Olsson et al. | |
| 7,243,641 B2 | 7/2007 | Zukouski | |
| 7,469,664 B2 | 12/2008 | Hofbauer et al. | |
| 7,581,526 B2 * | 9/2009 | Lehmann | 123/269 |
| 7,721,704 B2 * | 5/2010 | Lehmann | 123/307 |

OTHER PUBLICATIONS

Rotax 80-HP Rotax 912 Aircraft Engine (2 pages.) Printed Mar. 21, 2011. http://www.zenithair.com/pdf-doc/912ul-80hp.pdf.

* cited by examiner

TWO-STROKE UNIFLOW TURBO-COMPOUND INTERNAL COMBUSTION ENGINE

CROSS-REFERENCE TO RELATED APPLICATION

This application claims the benefit of U.S. Provisional Application No. 61/231,306, filed on Aug. 4, 2009, the disclosure of which is incorporated herein by reference.

BACKGROUND OF THE INVENTION

The stratified charge engine is a type of internal-combustion engine, similar in some ways to the Diesel cycle, but running on normal gasoline. The name refers to the layering of fuel/air mixture, the charge inside the cylinder. In a traditional Otto cycle engine the fuel and air are mixed outside the cylinder and are drawn into it during the intake stroke. The air/fuel ratio is kept very close to stoichiometric, which is defined as the exact amount of air necessary for a complete combustion of the fuel. This mixture is easily ignited and burns smoothly. The problem with this design is that after the combustion process is complete, the resulting exhaust stream contains a considerable amount of free single atoms of oxygen and nitrogen, the result of the heat of combustion splitting the $O_2$ and $N_2$ molecules in the air. These will readily react with each other to create $NO_x$, a pollutant. A catalytic converter in the exhaust system re-combines the $NO_x$ back into $O_2$ and $N_2$ in modern vehicles.

A direct injection diesel engine, on the other hand, injects diesel fuel (which is heavier and resistant to vaporization) directly into the cylinder, the combustion chamber is in the top of the piston. This has the advantage of avoiding premature spontaneous combustion—a problem known as detonation or ping that plagues Otto cycle engines—and allows the diesel to run at much higher compression ratios. This leads to a more fuel-efficient engine, which is commonly found in applications where it is being run for long periods of time, such as in trucks.

However the Diesel engine has problems as well. The fuel is sprayed right into the highly compressed air and has little time to mix properly. This leads to portions of the charge remaining almost entirely air and others almost entirely of unburnt fuel lacking for oxygen. This incomplete combustion leads to the presence of other pollutants such as partially burnt and unburnt fuel—polycyclic aromatic hydrocarbons and the plainly visible exhaust soot. The indirect injection diesel where fuel is injected into a pre-chamber (the best known being Ricardo Consulting Engineers' Ricardo Comet design), where the flame front from the pre-chamber ignition leads to better mixing of the air and fuel, smoother combustion in the cylinder, and a reduction in diesel knock. Indirect injection diesels are a kind of stratified charge engine. These benefits came at the cost of a 10% efficiency reduction compared to direct injection diesels.

The stratified charge design attempts to fix the problems with both fuels. It uses a direct-injection system, like the diesel, with its inherent ability to be run at efficient high compressions. However, like the Otto, it relies on gasoline's ability to mix quickly and cleanly in order to avoid the poor combustion found in older direct injection Diesels. To do this the fuel injectors are aimed to inject the fuel into only one area of the cylinder, often a small "subcylinder" at the top, or periphery, of the main cylinder. This provides a rich charge in that area that ignites easily and burns quickly and smoothly. The combustion process proceeds and moves to a very lean area (often only air) where the flame-front cools rapidly and the harmful $NO_x$ has little opportunity to form. The additional oxygen in the lean charge also combines with any CO to form $CO_2$, which is less harmful. This technology has also been applied to the latest electronically controlled direct injection diesels. The injection system on these engines delivers the fuel in multiple injection bursts to ensure better fuel/air mixing and reduced diesel knock. The much cleaner combustion in stratified charge gasoline engines allows for the elimination of the catalytic converter and allows the engine to be run at leaner (lower ratio of fuel to air) mixtures, using less fuel. It has had a similar effect on diesel engine performance. Today's diesels are cleaner and can be twice as powerful as before, while maintaining similar fuel economy.

After years of trying, this layout has proven not to be terribly easy to arrange. The system has been used for many years in slow-running industrial applications, but has generally failed to develop into an automobile engine. Many attempts have been made over the years, notably in Wankel engine applications, but only the Japanese car manufacturers have pressed ahead with piston-engine development.

There remains an important need to provide an low cost, high horsepower internal combustion engine having improved fuel efficiency and low NOx and particulate emissions, that can operate with a variety of fuels.

SUMMARY OF THE INVENTION

The present invention provides an improved cylinder design for a reciprocating two-stroke uniflow internal combustion (IC) engine, and for engines having multiple cylinders that provides improved swirling and turbulence of inlet air and mixing with fuel.

The present invention also provides a cylinder having a cylinder wall and a cylinder head, the cylinder head having an exhaust port, a fuel injector, and a spark means disposed through the cylinder head, a piston reciprocally mounted in the cylinder for movement alternately through compression and power strokes, and a scroll plenum extending unidirectional around the outside of the cylinder wall and having an inlet, and including swirl port disposed through the cylinder wall providing fluid communication from the scroll plenum into the cylinder chamber, wherein the at least one swirl port has a centerline disposed at an angle tangential with respect to the axial centerline of the cylinder and wherein the at least one swirl port is subject to opening and closing in response to movement of said piston.

In other aspects of the invention, the at least one swirl port includes a single swirl port, or a plurality of swirl ports.

An aspect of the invention is to provide uniform, turbulent, upward inlet air swirling through the cylinder, which results in rapid, well defined, stratified charge combustion and very short combustion delay times.

Another aspect of the present invention is a two-stroke uniflow internal combustion (IC) engine including a high pressure supercharger inlet air system, and an exhaust gas turbine that powers the supercharger.

Another aspect of the present invention is a low pressure power turbine that is driven by the low pressure exhaust gas and geared to the engine crankshaft.

Another aspect of the present invention is a two-stroke uniflow internal combustion (IC) engine that is air cooled.

Another aspect of the present invention is the improved cylinder design for the reciprocating two-stroke uniflow internal combustion (IC) engine using lean burning, direct fuel injection with high inlet air swirl and mixing with the fuel, and a spark ignition means. The lean burning reduces the flame temperature and combustion heat losses and NOx emissions.

Another aspect of the present invention is the use of thermal barrier treatments on the inside of the cylinders to further reduce combustion heat loss.

Another aspect of the present invention is the use of a wide variety of fuels, including gasoline, diesel, alcohol, kerosene, and biodiesel with the invention, separately, intermittently, or together, with only minor adjustments in to the operating parameters.

The engine of the present invention can be used is a wide variety of applications including aircraft, automobiles, marine vessels, locomotives, heavy construction equipment, and military vehicles.

In another aspect of the invention, the scroll plenum and the plurality of swirl ports extend substantially around the entire circumference of the cylinder wall. The plurality of swirl ports are defined by a plurality of spaced-apart, aerodynamically-shaped swirl vanes, each of the plurality of swirl vanes disposed at an angle tangential with respect to the axial centerline of the cylinder. The number of swirl vanes disposed around the circumference of the cylinder wall is about 10 to about 100.

Another aspect of the invention is the configuration of the plurality of swirl ports to provide the same mass rate of air at the same linear velocity therethrough.

In another aspect of the invention, the lateral cross section of the scroll plenum reduces in area as it extends around the circumference of the cylinder wall, thereby maintaining the velocity of the air flowing through the air plenum and succeeding swirl ports progressing around the circumference of the cylinder wall. In another aspect of the invention, the cross sectional shape of a swirl port includes circular, oval, elliptical and polygonal, with streamlined flow passages to provide high flow coefficients and precisely directed flow.

In another aspect of the invention, the piston includes a plurality of auxiliary vanes disposed on the crown and oriented in the radial direction from the center of the piston crown, transverse to the direction of the swirl vanes, to increase the turbulence of the swirling scavenging air upward within the cylinder chamber.

DETAILED DESCRIPTION OF THE INVENTION

Figure 1:
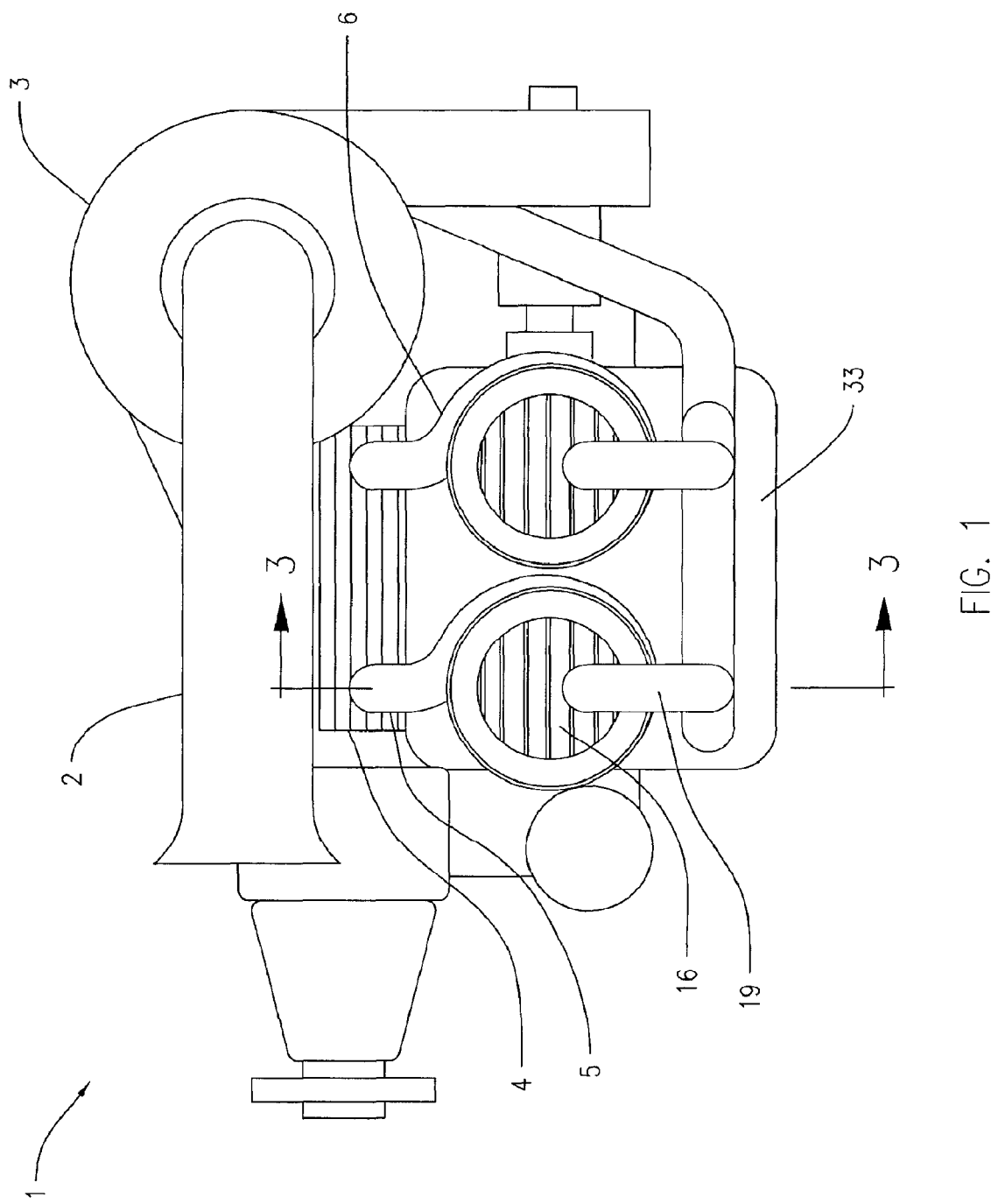
FIG. 1 shows a side elevation view of a two-stroke uniflow internal combustion (IC) engine of the present invention.
Figure 2:
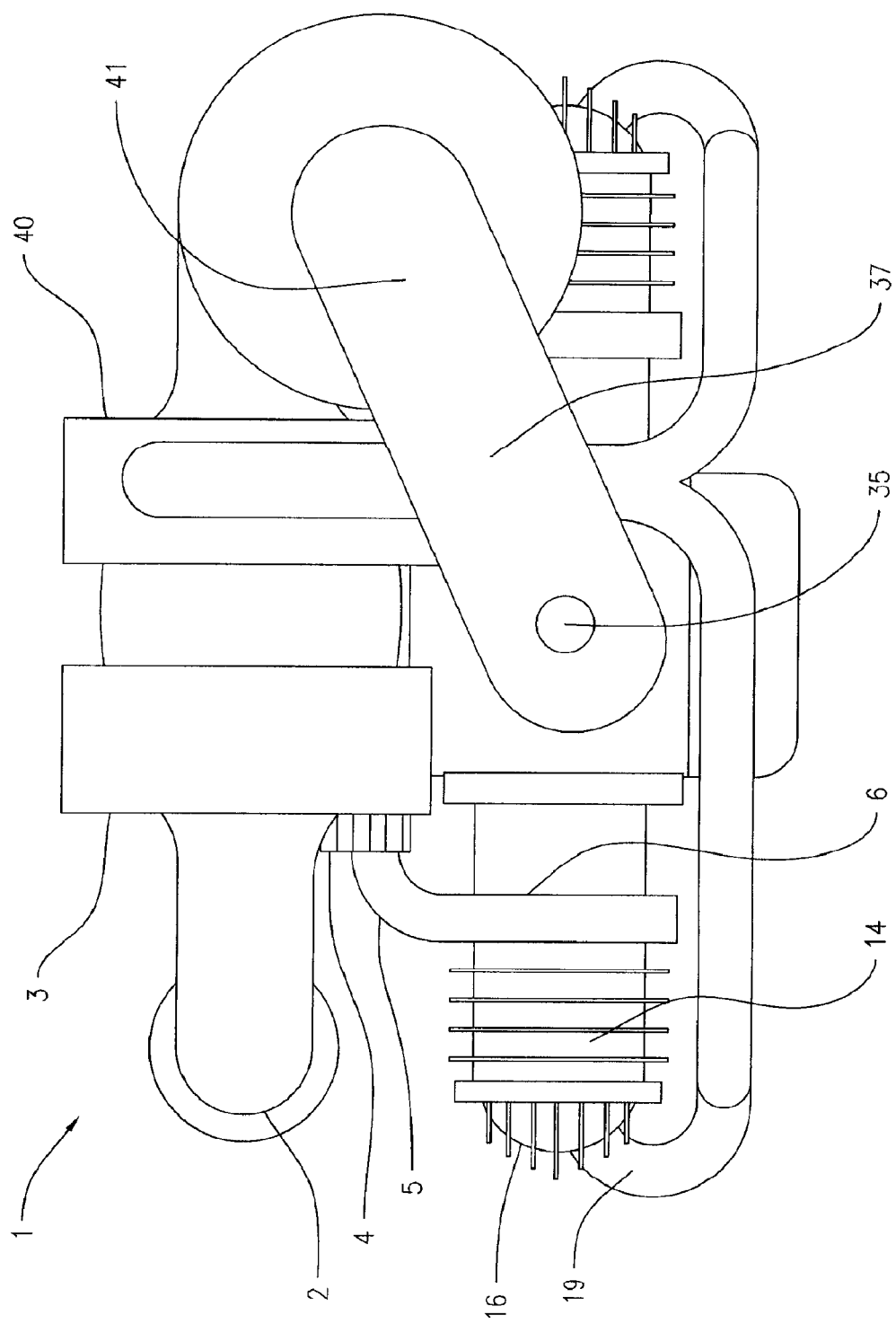
FIG. 2 shows a rear elevation view of the IC engine.

An embodiment of the two-stroke uniflow internal combustion (IC) engine of the present invention shown in FIGS. 1 and 2 illustrates a flat, four cylinder air cooled engine 1 with a compact two-stroke cycle configuration. The engine of the present invention is of a much smaller size and is much lighter in weight than a comparably-powered engine. Each cylinder 14 of the engine includes an inlet air scroll plenum 6 that communicates inlet air to cylinder chamber 21 (shown in FIG. 3). A supercharger 3 draws ambient inlet air through an air intake pipe 2 and discharges compressed, cooled inlet air to an inlet air manifold 4, which distributes the inlet air to each of the four scroll plenums 6 through air inlet ducts 5. The supercharger 3 is shaft-powered by an exhaust-driven turbine 40 to generate high pressure ratio air compression. Exhaust gases exit the cylinders through cylinder heads 16 via exhaust outlet ducts 19. An example of internal combustion engines using a supercharger are described in U.S. Pat. Nos. 4,797,070, 4,709,683, 5,115,788, and 4,822,242, the disclosures of which are incorporated by reference in their entirety.

Figure 3:
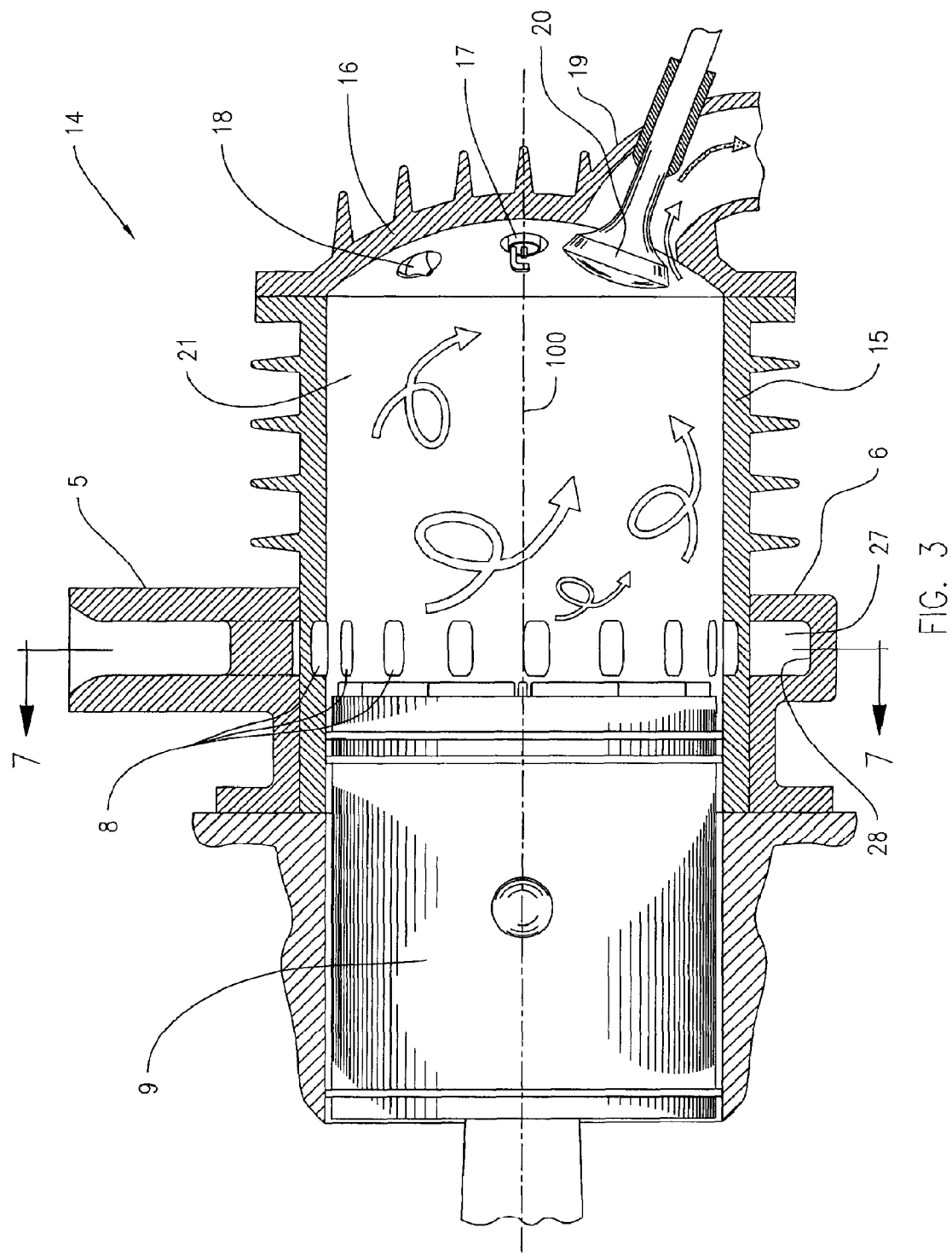
FIG. 3 shows a vertical sectional view through a cylinder of the present invention in an air intake and scavenging condition taken through line 3-3 of FIG. 1.
Figure 4:
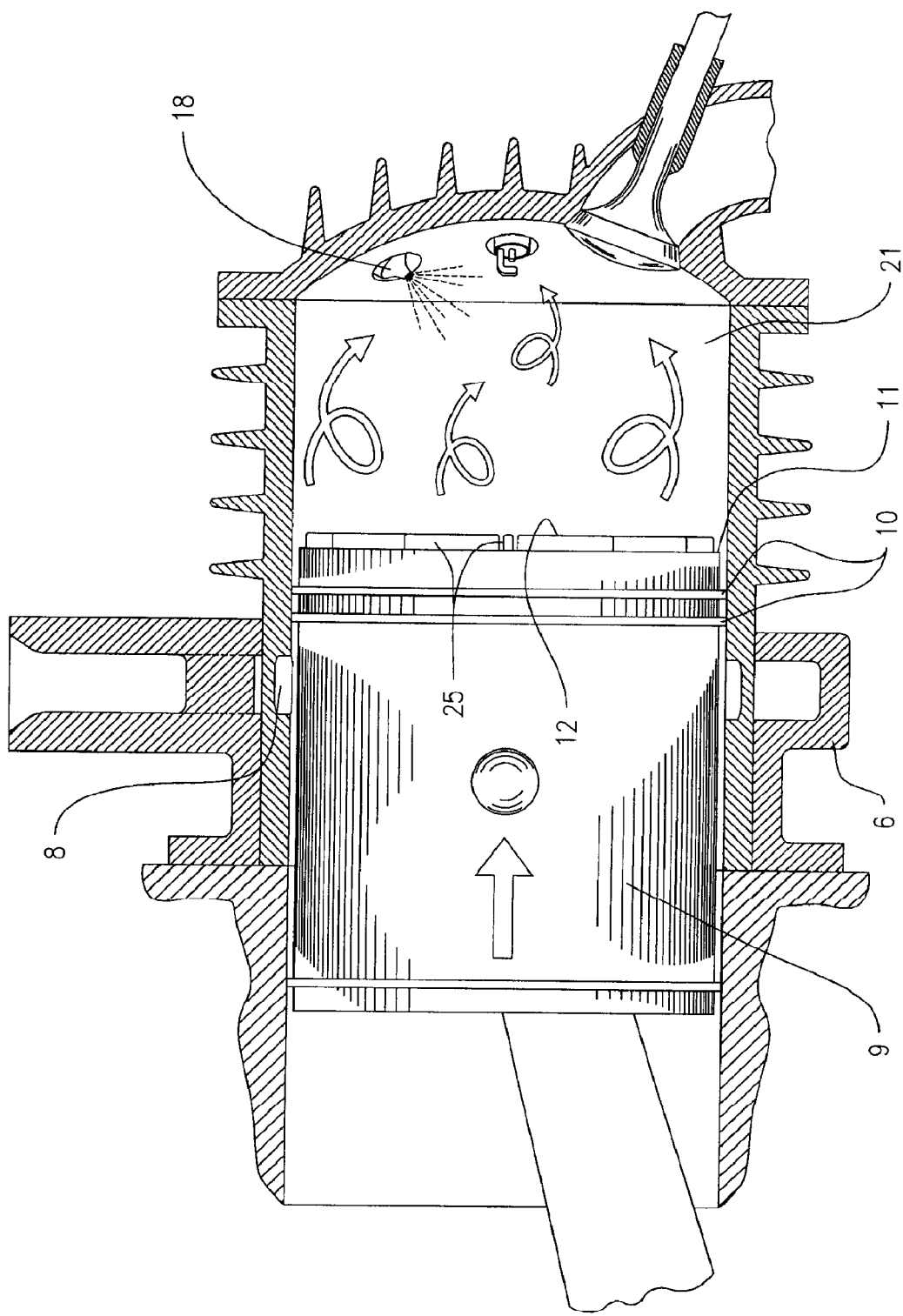
FIG. 4 shows a vertical sectional view through the cylinder of the present invention in a compression and fuel injection condition.
Figure 5:
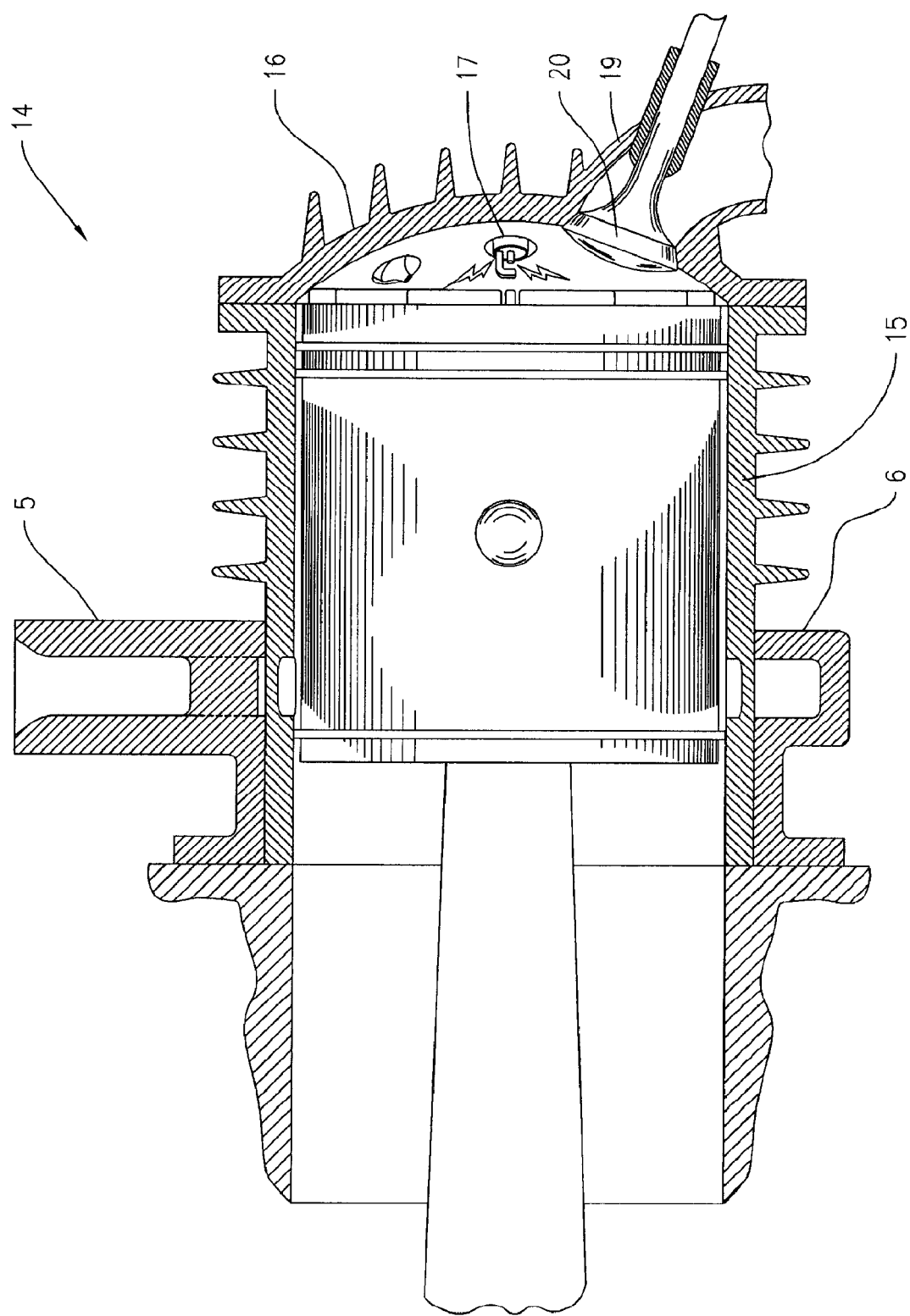
FIG. 5 shows a vertical sectional view through the cylinder of the present invention in a combustion condition.
Figure 6:
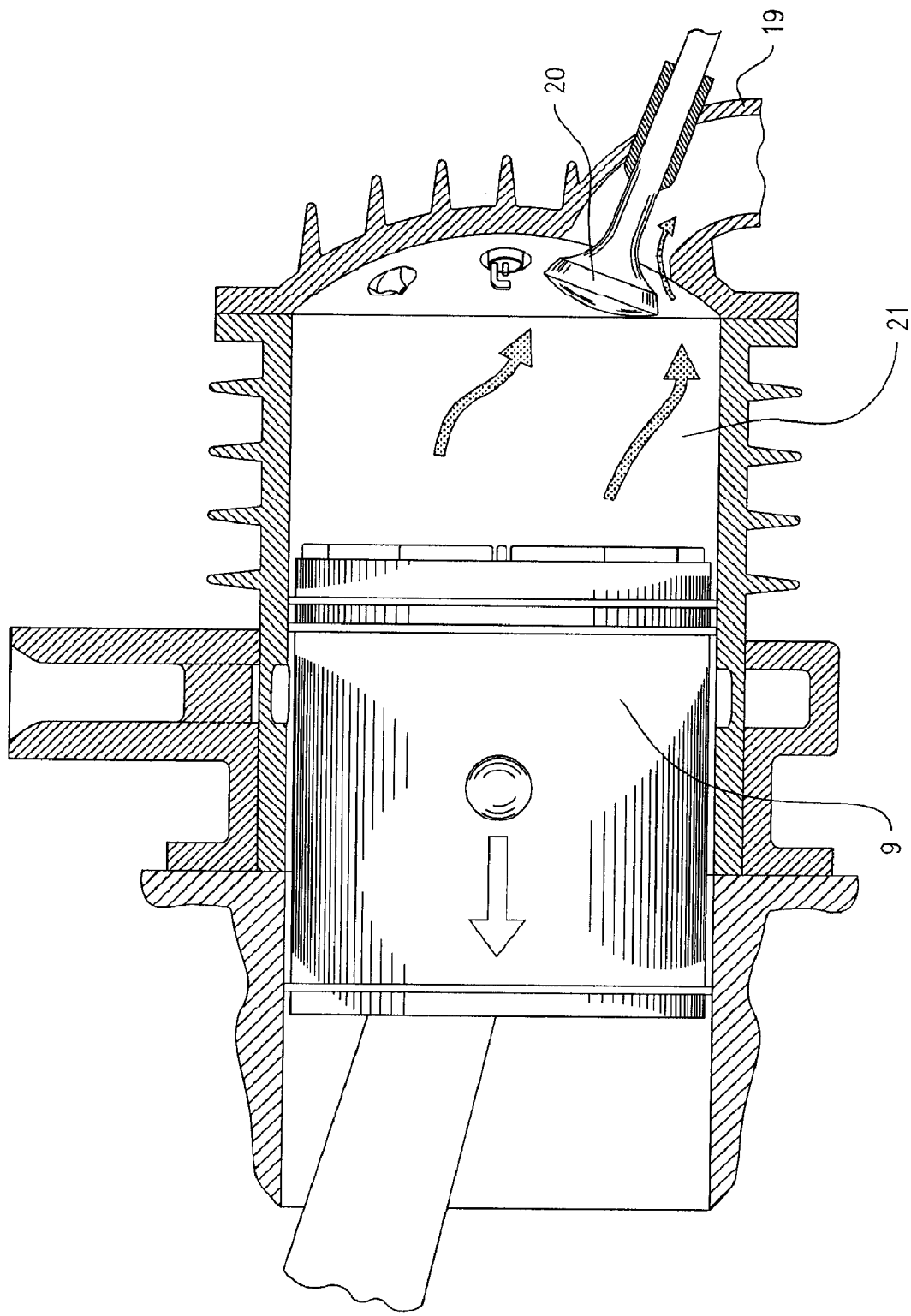
FIG. 6 shows a vertical sectional view through the cylinder of the present invention in a combustion exhaust condition.

FIG. 3 shows a vertical sectional view through one of the cylinders 14 of the engine 1. The cylinder 14 includes a cylindrical wall 15 that defines a variable-volume cylinder chamber 21 between a piston 9 and a cylinder head 16, and has exterior surface cooling fins. Disposed in the cylinder head 16 are a high energy sparkplug 17 and a fuel injector 18. An exhaust valve 20 operates axially between an open position, and a closed position as shown in FIG. 3, to provide fluid communication between the cylinder chamber 21 and the exhaust outlet duct 19. FIGS. 4-6 show vertical sectional views through the cylinder at other operating phases, as discussed herein after. The piston 9 of diameter D reciprocates within the cylinder 14 through a stroke length L, to define the displacement of the cylinder chamber. The ratio of D:L is usually about 1 or less (a short-stroke displacement).

Figure 7:
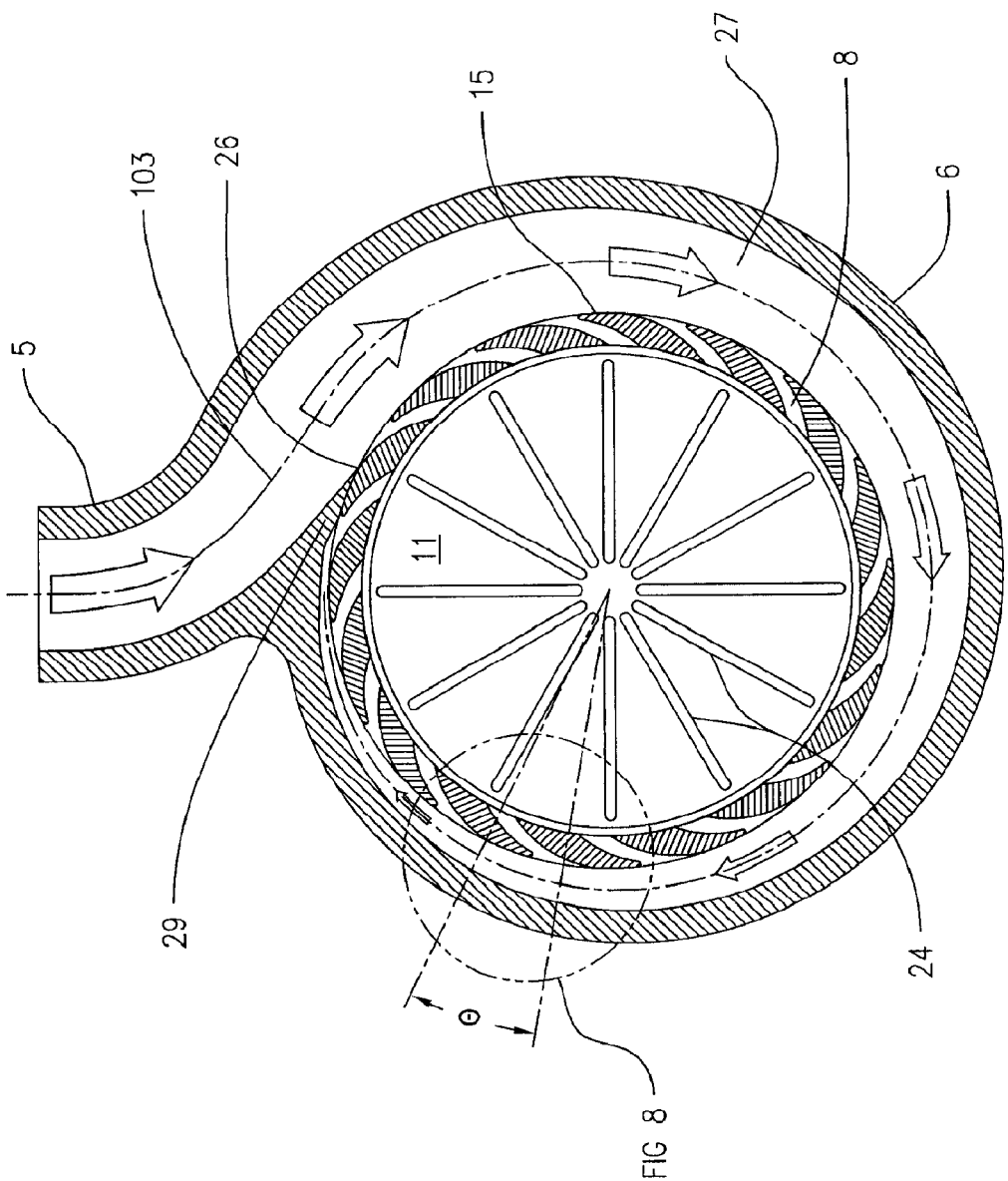
FIG. 7 shows a horizontal sectional view through the cylinder taken through line 7-7 of FIG. 3.
Figure 8:
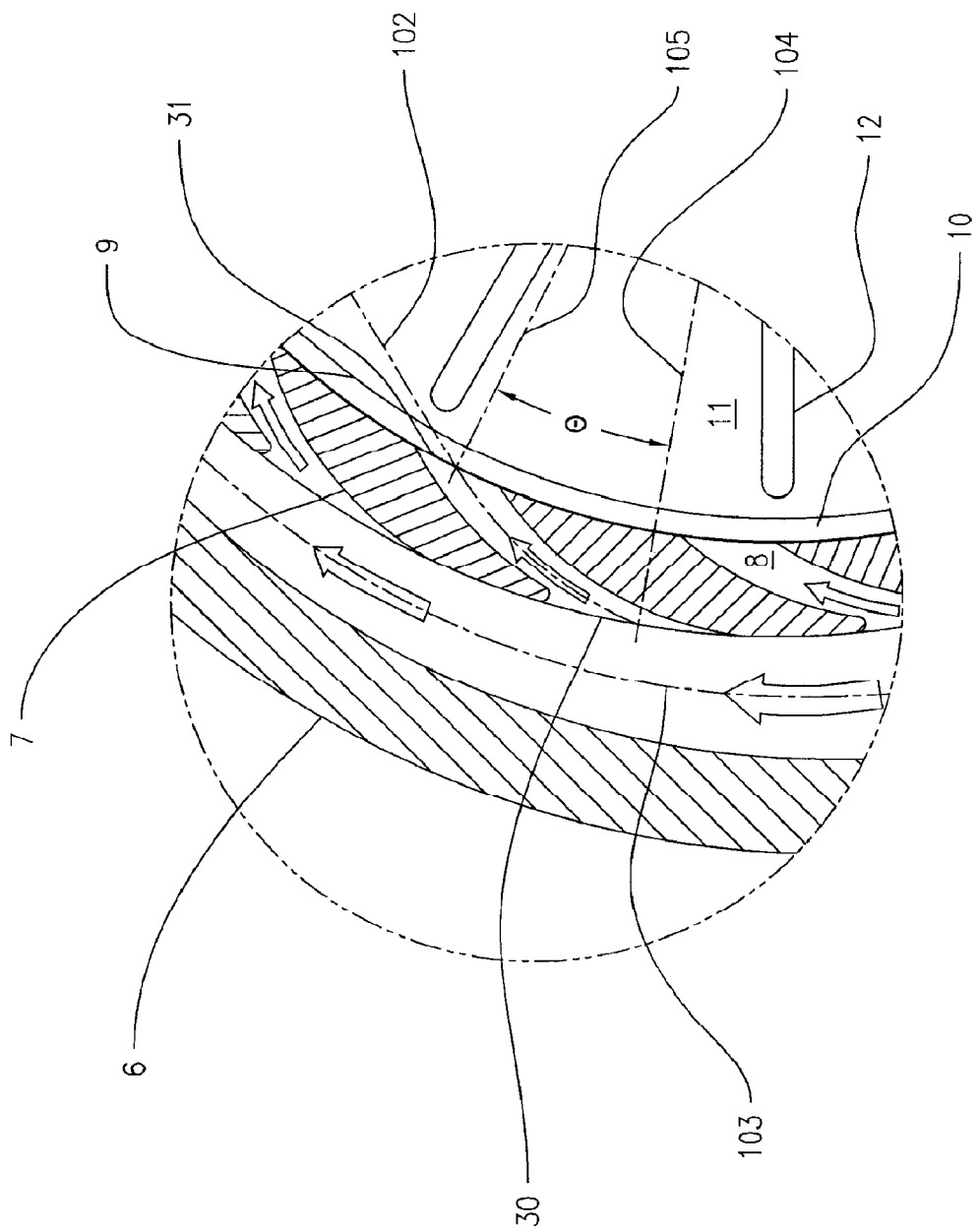
FIG. 8 shows an exploded sectional view of the cylinder selected from FIG. 7.

FIGS. 7 and 8 illustrate the scroll plenum 6 communicating pressurized inlet air from the air inlet duct 5 to the cylinder chamber 21. The scroll plenum 6 defines an enclosed plenum chamber 27 that extends from the inlet air duct 5 in a single direction (shown clockwise in the illustrated view) around the outside of the cylinder wall 15. A plurality of swirl ports 8 formed through the portion of the cylinder wall 15 associated with the scroll plenum 6, provide fluid communication from the scroll plenum 6 into the cylinder chamber 21. The scroll plenum 6 engages the outside surface of the cylinder wall 15 substantially tangentially, and extends in one direction around and along the outside of the cylinder wall 15 to a terminating point 29. The scroll plenum 6 extends substantially 360° around the cylinder 14 from its inlet point 26 to its terminating point 29. Although the extension of the scroll plenum can be less than the full circumference of the cylinder, significant reduction in the extension can result in substantial loss of air swirl, which can reduce the power and efficiency of the engine.

The plurality of swirl ports 8 are defined by a plurality of spaced-apart swirl vanes 7, and have a flow path and a centerline 102. In an aspect of the invention, the swirl port 8 is elongated through the cylinder wall 15 to provide tangential direction to the air flow leaving the swirl port 8 and entering the cylinder chamber 21. The centerline 102 of the swirl port 8 at the inlet 30 is directed away from the centerline 103 of the plenum chamber 21 at an angle of about 10° to about 45°. The pathway of the swirl port 8 from the inlet 30 to the outlet opening 31 are curved up to an angle of about 45°, at least in part to account for the arc angle θ defining the centers of the inlet 30 and outlet openings 31 of the swirl pathway. In the illustrated embodiment shown in FIG. 7, there are 16 equally sized swirl ports 8 disposed equally spaced around circumference of the cylinder, wherein the angle θ is 22.5°. The centerline 102 of the swirl port 8 at the outlet opening 30 is directed from tangential to the centerline 100 of the cylinder chamber 21 at an angle of about 80° to about 45°. The cross sectional shape of a swirl port includes circular, oval, elliptical, square, rectangular, and other polygonal. To reduce drag on the flow of air, the inlet or upstream corners and edges of the swirl ports are rounded.

The cross sectional shape of the plenum chamber 27 is shown as substantially rectangular, although other shapes including semicircular are contemplated by the invention. The plenum chamber 27 is sized and configured, along with the swirl ports 8 around the circumference of the cylinder 14, to deliver an equal mass weight of inlet air through each of the plurality of swirl ports 8, at an equal linear velocity of air through the outlet opening 31 of the swirl ports. As the mass of air flows around the circumference of the plenum 6, an incremental mass portion of air passes out of the plenum chamber and through a swirl port. Consequently, the size of the scroll plenum 6 is tapered between the inlet point 26 and the terminating point 29, with a corresponding reduction in the cross sectional area of the scroll chamber 27 between points 26 and 29. Under ideal conditions, and assuming no pressure losses along the scroll plenum chamber, the plenum chamber transverse area tapers to account for the incremental reduction in the mass of air flowing through each successive swirl port 8, and assuming that the height of the plenum is constant, the width (in plan view) of the scroll plenum chamber is reduced linearly. Under the same ideal conditions, and assuming an equal pressure drop, the size and shape of the pathways of the plurality of swirl ports 8 are equal, and provide the same airflow velocity for the same air mass rate. By using well known computational methods, such as computational fluid dynamics (CFD), the appropriate size and distribution of each individual swirl port (or conversely, swirl vane) and for the scroll plenum can be determined for actual operating conditions, to provide an equal mass weight of air through each of the plurality of swirl ports 8, at an equal linear velocity of air through the outlet opening 31 of the swirl port.

Figure 11:
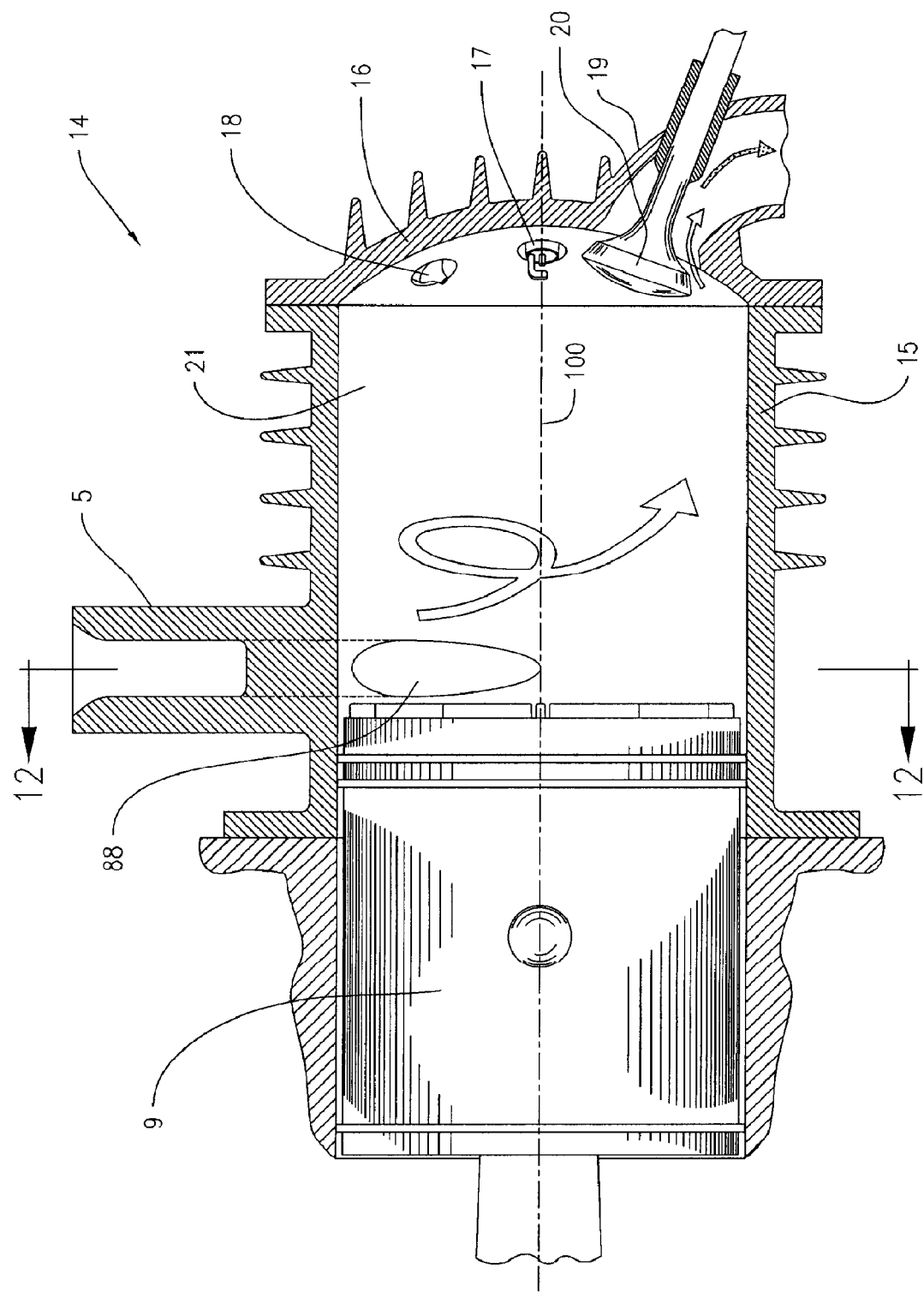
FIG. 11 shows a vertical sectional view through a cylinder of another embodiment of the invention.
Figure 12:
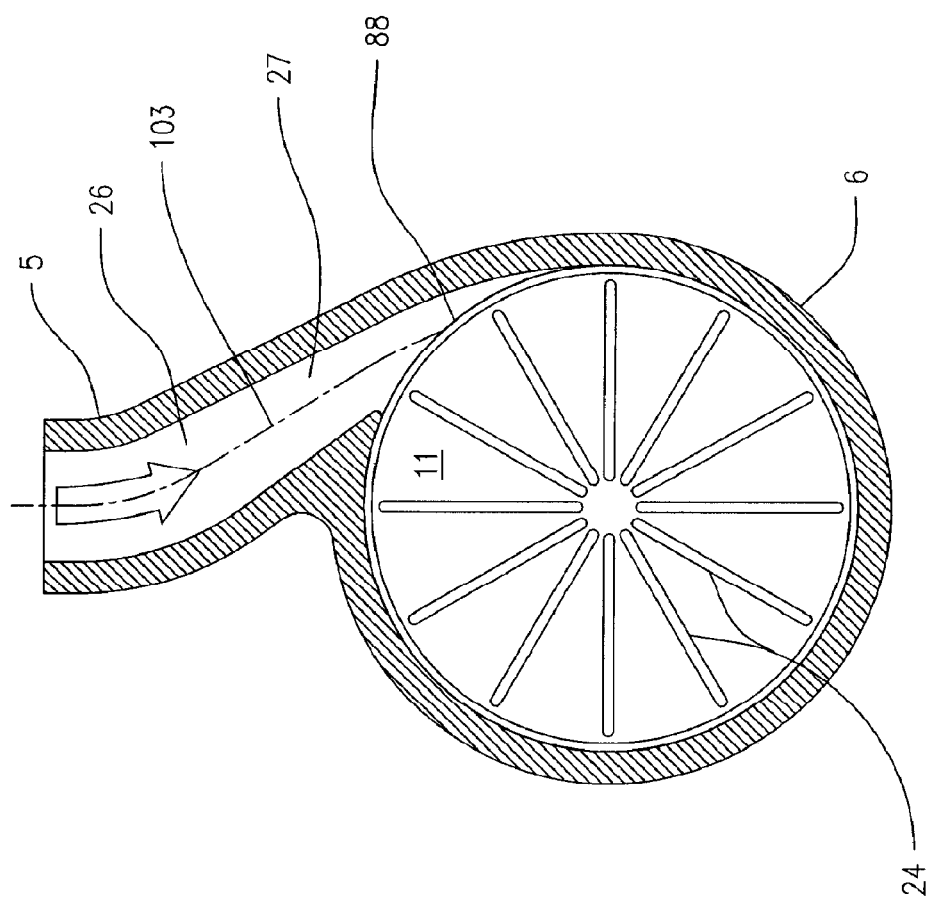
FIG. 12 shows a horizontal sectional view through the cylinder taken through line 12-12 of FIG. 11.

FIGS. 11 and 12 show another embodiment of a cylinder of the invention having a single swirl port 88.

A typical swirl velocity, defined as the average velocity of the air exiting the swirl port 8 at the outlet opening 31, is about 500 feet per second, with a pressure drop of about 4%. The swirl velocity ratio, defined as the ratio of the swirl velocity to the average upward air velocity through the cylinder, has been shown to correlate with maximum cylinder pressure achieved in a uniflow scavenged cylinder design.

The swirl port 88 or ports 8 can be formed through the cylinder wall 15 by a number of means including wire electrical discharge machining (wire EDM), drilling, and broaching. Alternatively, the swirl ports can be formed by positioning and fixing the plurality of swirl vanes between two sections of cylinder wall.

The two stroke diesel cycle includes an air intake phase, a compression stroke, a fuel injection phase, a combustion phase, a power stroke, and an exhaust phase.

Figure 9:
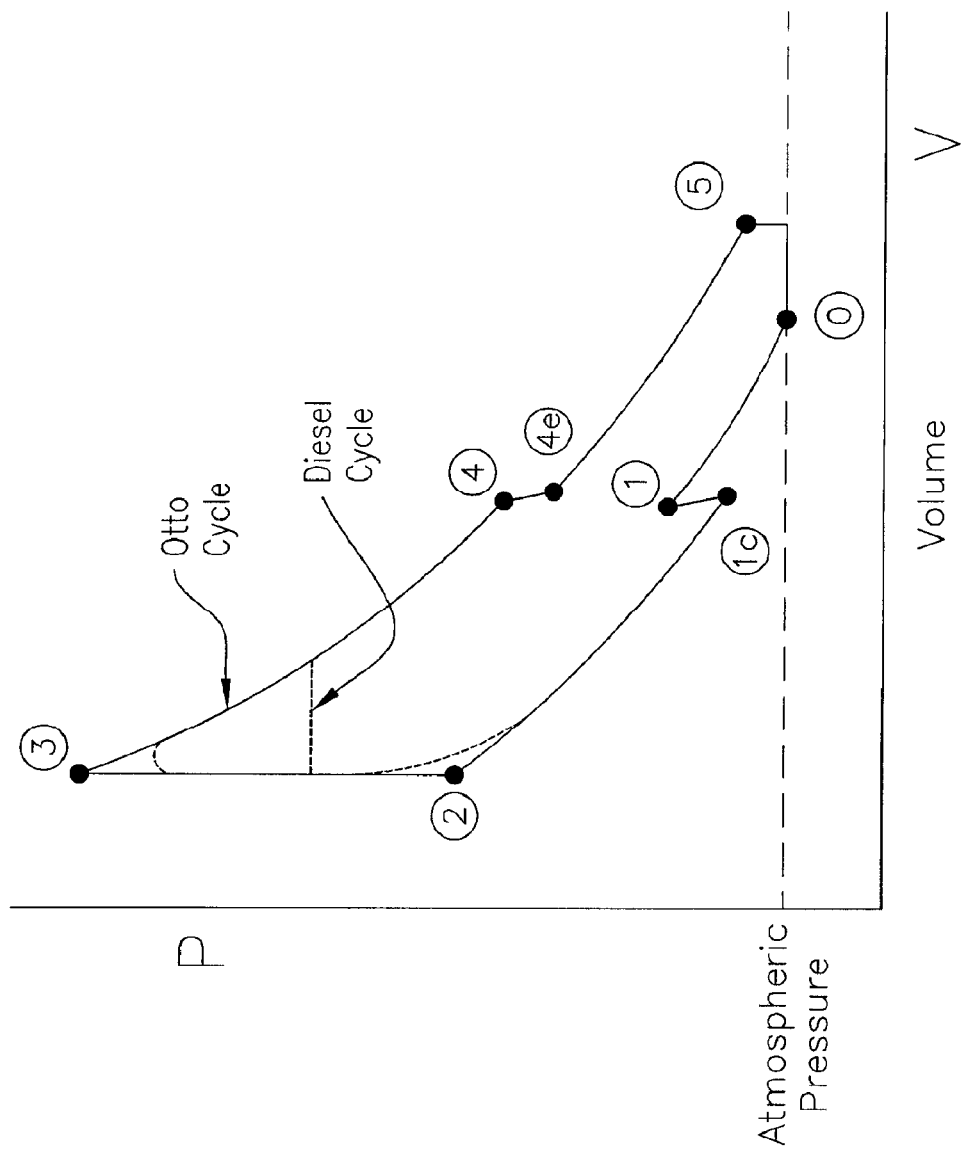
FIG. 9 shows a pressure-volume diagram for the diesel cycle of the present invention.
Figure 10:
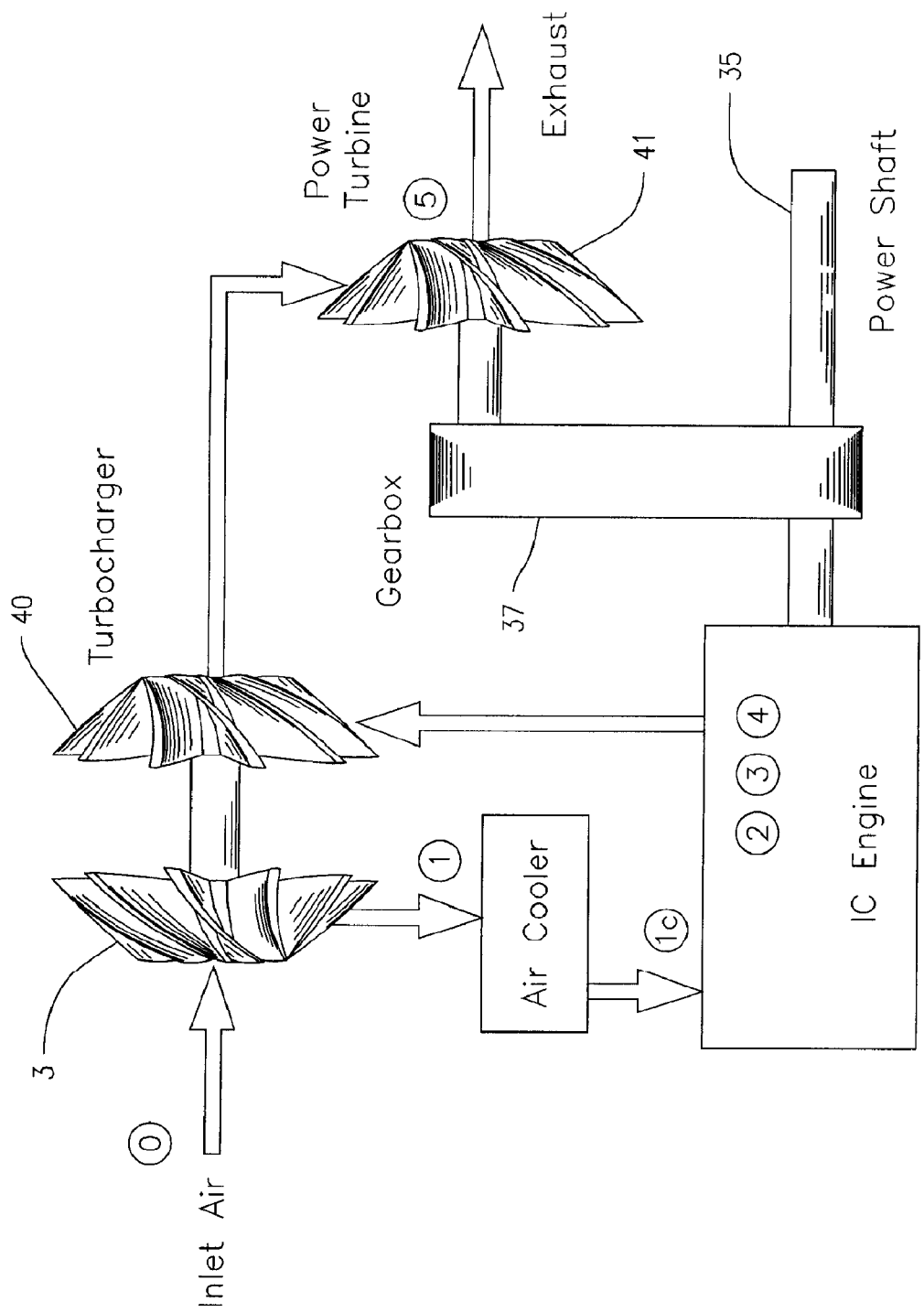
FIG. 10 shows a schematic representation of the engine components indicating the pressure-volume conditions illustrated in the pressure-volume diagram of FIG. 9.

The air intake and scavenging phase is illustrated in FIG. 3. Preceding the scavenging of inlet air into the cylinder, ambient air at ambient temperature and pressure (denoted as condition 0 on the pressure-volume (P-V) diagram shown in FIGS. 9 and 10) is compressed by an exhaust gas-driven supercharger 3 to condition 1 on the P-V diagram. The supercharger 3 is an air compressor used for forced induction of the internal combustion engine. The greater mass flow-rate provides more oxygen to support combustion than would be available in a naturally-aspirated engine, which allows more fuel to be provided and more work to be done per cycle, increasing the power output of the engine. The supercharger can be powered mechanically by a belt, gear, shaft, or chain connected to the engine's crankshaft. It can also be powered by an exhaust gas turbine. The compression of the ambient air also raises its temperature, so an after cooler unit removes heat and increases the density, bringing the after-cooled compressed inlet air to condition $1c$ on the P-V diagram.

FIG. 3 shows the piston 9 having arrived at the bottom of its reciprocal stroke within the cylinder 14, and supercharged high pressure inlet air surges under pressure through the scroll plenum 6 and the uncovered swirl ports 8, and into the cylinder chamber 21. The pressurized inlet air expands and swirls in tangential turbulent unidirectional flow that spirals upwardly throughout the cylinder chamber 21. The exhaust valve 20 remains open until combustion gases have been exhausted. The exhaust valve 20 can also be timed to remain open to allow some of the scavenging inlet air to flow upwardly through and out the exhaust duct 19, before the exhaust valve 20 closes. By holding open the exhaust valve 20 and allowing some of the inlet air to flow completely through and out the exhaust duct 19, the exhaust gases temperature is reduced, which reduces the formation of NOx.

The initiation of the compression phase is illustrated in FIG. 4, showing the piston rising within the cylinder, and covering the swirl ports 8 to cut off the flow of inlet air into the cylinder chamber 21. As the piston is driven to its top dead center position, shown in FIG. 5, the inlet air is compressed from an initial cylinder pressure to a high compression pressure, shown at condition 2 on the P-V diagram. The compression ratio of about 8:1 to about 12:1 causes a significant temperature increase. The power for the compression stroke is provided by the other cylinders of the engine. During and typically near the end of the compression phase, fuel is dispensed into cylinder chamber 21 by fuel injector 18. The fuel, including gasoline, diesel, or another combustible fuel liquid, is injected by dispersion slightly downwardly in the same tangential direction as the flow of the turbulent, swirling air, providing intimate air-fuel mixing. The fuel injector injects the fuel in the downstream direction of the aforementioned swirl flow, and upstream of the spark ignitor, at a 10 to 30 degree angle with respect to the inside surface of the cylinder head. The rapid and intimate mixing provides a shorter combustion delay time, allows for a more complete combustion of the fuel, and completes the combustion process as early as possible in the expansion or power stroke.

The combustion phase is illustrated in FIG. 5, showing the ignition and combustion of the air/fuel mixture. A high energy spark igniter 17 (commonly referred to as a spark plug) can be used to emit a spark that ensures ignition and combustion of the air-fuel mixture. The combustion of the fuel initiates the power stroke, with the rapidly expanding combustion gases shown at condition 3 of the P-V diagram, driving the piston 9 through toward the end of the power stroke at condition 4 on the P-V diagram.

FIG. 6 shows the initiation of the exhaust phase, where the expanding combustion gases has driven the piston through the power stroke, and the cylinder chamber 21 has filled with combustion gases. As the piston 9 nears the bottom of the stroke, the opening of the exhaust valve 20 and uncovering of the swirl ports 8 initiate exhausting of combustion gases out the exhaust duct 19. The exhaust valve 20 is shown in FIG. 3 as a sodium-cooled poppet valve as described in well known references. The escaping exhaust gas at condition 4e on the P-V diagram expands and drives the turbocharger 40 and low pressure power turbine 41, to condition 5 on the P-V diagram. The low pressure power turbine 41 in turn powers the drive shaft 35 through a gearbox 37. An example of a low pressure exhaust turbine is described in U.S. Pat. No. 7,240,491, the disclosure of which is incorporated by reference in its entirety. The discharge of the reduced pressure exhaust gases from the tailpipe at about 1000° F., brings the gases back to the ambient condition 0.

A programmed solenoid can be used to fully open the exhaust valve 20 at engine starting condition.

The design and sizing of the plurality of swirl ports can be specified for a particular engine design and fuel source using computational fluid dynamics (CFD). The number of swirl ports 8 and corresponding inlet vanes 7 can number up to hundreds, and more typically numbers between about 12 and 48.

In an aspect of the invention, a lean burning air-fuel mixture is provided to improve fuel efficiency and power generation, through more efficient lean burning of the fuel, and through improved thermal efficiency. Typically, the benefits of leaner burning of fuel include improved fuel efficiency, lower emissions and reduced heat losses. The theoretical lean mixture that can be as low as 0.04. A preferred range for lean burning is about 0.2 to about 0.8.

Each piston 9 includes a piston top 11 and piston rings 10 disposed within annular grooves in the sidewall of the piston 9. The top 11 of the piston includes a plurality of auxiliary vanes 24 oriented in a radial direction from the center of the piston, and transverse to the direction of the swirl vanes 7, to increase the turbulence of the swirling scavenging air upward within the cylinder chamber 21. The number of auxiliary vanes can be the same as or different from the number of swirl ports 8. The auxiliary vanes have elongates side walls 25 extending radially to proximate the edge of the piston top 11 to help effect an upward turning of the swirling air flow.

An example of the engine using the improved cylinder of the present invention is a compound turboprop engine is a two-stroke, uniflow, four cylinder air cooled flat-four aircraft engine based on the Rotax 912 (http://www.rotaxservice-.com/rotax_engines/rotax_912ULsp.htm), with a high pressure ratio supercharger compressor that is powered by an exhaust driven turbine. The high pressure turbine is followed by a low pressure power turbine that is geared to the engine crankshaft. An example of a low pressure exhaust turbine is described in U.S. Pat. No. 7,240,491, the disclosure of which is incorporated by reference in its entirety. The engine cylinders have circumferential intake ports at the bottom of the piston stroke with swirl vanes. A large single exhaust valve is at the top of the cylinder. The fuel is injected directly into the swirling airflow near the top of the piston stroke. The fuel is ignited by a high energy sparkplug.

Advantageous features of an engine of the present invention include:

1) straight-through scavenge flow with high scavenge efficiency.

2) full circumferential cylinder intake ports with swirl vanes and low pressure losses.

3) stratified charge with high swirl for reduced combustion delay and high efficiency.

4) large sodium cooled exhaust valves with solenoid operation for starting.

5) high joule spark ignition for cold weather starting and for burning different fuels.

6) air cooled compact engine geometry for light weight and low cost.

7) inlet manifold plenum with intercooling and uniform flow to all cylinders.

8) insulated exhaust manifold designed to damp out blowdown pressure pulses.

9) short stroke, over-square cylinder geometry for low piston speeds at high revolutions.

10) thermal barrier coating (TBC) on piston crowns and inside of cylinder heads to reduce heat loss.

11) lean burning for high efficiency and reduced combustion heat loss and reduced emissions.

12) TBC coatings and lean burning also reduce HC, CO, and NOx emissions.

This engine can be scaled up or down over a large range to meet power requirements. The engine operating with the improved inlet air swirling means of the present invention has about half of the combustion heat loss of a conventional engine.

Some Important Advantages for the Turbo Compound IC Engine of the present invention include:

a) Small Size—Light Weight: The compact two-stroke, pressure lubricated engine configuration has a much smaller size and is much lighter in weight than a conventional 500 hp engine configuration. The size of a 500 HP engine is 2 ft. long and 2 ft. wide.

b) Inlet and Exhaust Systems: Provides uniform flow to all of the engine cylinders and uniform flow and reduced flow pulsations to the turbine. Also, the inlet plenum is used as a compressor exit intercooler, with cooling fins around the outside.

c) Swirl Combustion in the Engine Cylinders: In contrast to a conventional loop scavenged two-stroke design, where uniform swirl flow cannot be achieved, the engine of the present invention has low pressure loss swirl vanes in inlet ports spaced about 360 degrees around the air inlet of the cylinders. Swirl flow, which induces high intensity, small scale turbulence, is important for rapid mixing with a short combustion delay time, and to complete the combustion process as early as possible in the expansion stroke. Test data results have been published for swirling flow in a Diesel engine. One set of data is plotted on a pressure-crank angle diagram for four different swirl flow ratios. As the swirl rate is increased, the maximum cylinder pressure increases from 600 psi to 900 psi. The maximum pressure also occurs at a smaller crank angle with the higher swirl rate. The improvement in mep and efficiency due to the increase in swirl is significant and substantial.

d) High Scavenge Efficiency: For the same combustion delay time, scavenge efficiency does not affect cycle efficiency, because energy input (fuel flow) is decreased as work output is decreased because of more un-scavenged combustion products. However, low scavenge efficiency and dilution of the unburned gases in the cylinder with burned products will increase the time required for the fuel to find the oxygen, which increases combustion delay time and the crank angle for maximum pressure, which does decrease the cycle efficiency. The uniflow cylinder design of the present invention has a much higher scavenge efficiency (about 90%) than the loop scavenged design (about 70%).

e) Solenoid Push Rods for Starting: Starting the high compression engine would be accomplished by programming solenoids on the exhaust valve push rods to be fully open at starting conditions. When the engine reaches starting speed with a relatively small electric starter motor, the fuel injectors and igniters would be timed to fire the cylinders as the exhaust valves are closed, in the proper sequence.

f) Fuel Flexibility: By using a computer controlled high energy spark ignition system, rather than depending on compression ignition, a wide range of fuels could be used. Also the ignition timing could be controlled to improve cold weather starting and match all operating conditions, which would improve off-design efficiency.

g) Lean Burning: The two-stroke cycle, direct injection, turbo-compound engine would take advantage of the direct injection by burning lean at high power conditions, which would improve engine efficiency. Also, the lower combustion temperatures, combined with thermal barrier coatings (TBC) would greatly reduce heat losses to the cooling system, which would result in a large improvement in engine efficiency. The engine power would be controlled by the fuel flow, which would eliminate intake air throttling and result in low intake manifold pressure losses and higher efficiency at low power conditions. Very lean burning can be accomplished with high swirl, stratified charge fuel injection and high energy spark ignition.

EXAMPLES

Comparative Example 1

The Table A below shows a calculated comparison of the horsepower output and Specific fuel consumption (SFC) for various internal combustion engines.

TABLE A

| IC Engine: | Horsepower Output: | Calculated SFC: | Test SFC: |
|---|---|---|---|
| Typical Auto Engine | 200 | 0.567 | 0.55 |
| Typical Diesel Engine | 400 | 0.451 | 0.45 |
| Napier Nomad 1 Inline Compound Turboprop | 3,000 | 0.350 | 0.345 |
| HAECO-Baker Compound Turbo Diesel | 718 | 0.386 | 0.365* |
| HAECO-Detroit Diesel Compound Turbo Diesel | 400 | 0.392 | No Results |
| Compound Engine Turboprop of the Invention | 500 | 0.286 | — |

*Baker Engineering cycle analysis.

Example 2

Published and calculated specifications for a conventional Rotax 912 engine, and calculations for a modified Rotax 912 turbocompound engine with the uniflow internal combustion cylinder of the present invention, are presented below in Table B:

TABLE B

| | Rotax 912 | | Turbocompound |
|---|---|---|---|
| | (Published) | (Calculated) | (calculated) |
| Horsepower | 80 | 80.2 | 500 |
| Displacement - cu. in. | 74 | 75.9 | 61.6 |
| SFC - lb/hp-hr | 0.46 | 0.49 | 0.286 |

I claim:

1. A reciprocating two-stroke uniflow multiple cylinder internal combustion (IC) engine including a cylinder having a cylinder wall and a cylinder head, the cylinder head having an exhaust port, a fuel injector, and a spark means disposed through the cylinder head, a piston reciprocally mounted in the cylinder for movement alternately through compression and power strokes, and a scroll plenum extending unidirectional around the outside of the cylinder wall and having an inlet and a plurality of swirl ports disposed through the cylinder wall providing fluid communication from the scroll plenum into the cylinder chamber, wherein the plurality of swirl ports enter the cylinder chamber tangentially with respect to the axial centerline of the cylinder, and wherein the plurality of swirl ports are subject to opening and closing in response to movement of said piston.

2. The engine of claim 1 wherein the scroll plenum and the plurality of swirl ports extend substantially around the entire circumference of the cylinder wall.

3. The engine of claim 1 wherein the plurality of swirl ports are defined by a plurality of swirl vanes, each of the plurality of swirl vanes disposed at an angle tangential with respect to the axial centerline of the cylinder.

4. The engine of claim 1 wherein the lateral cross section of the scroll plenum reduces in area as the scroll plenum extends around the circumference of the cylinder wall.

5. The engine of claim 1 wherein the plurality of swirl ports are configured independently to provide the same mass rate of air at the same linear velocity therethrough.

6. The engine of claim 1 further including a high pressure air supercharger powered by an exhaust gas turbine.

7. The engine of claim 1 wherein the crown of the piston includes a plurality of auxiliary vanes extending radially to deflect scavenging air upward into the cylinder chamber.

8. The engine of claim 1 wherein the cross sectional shape of the plurality of swirl ports can include circular, oval, elliptical, rectalinear, and other polygonal.

9. The engine of claim 1 wherein the fuel injector injects the fuel in the downstream direction of the aforementioned swirl flow, and upstream of the spark ignitor, at a 10 to 30 degree angle with respect to the inside surface of the cylinder head.

10. The engine of claim 1 wherein the piston crowns and inside of cylinder heads include a thermal barrier coating (TBC) to reduce heat loss.

11. A reciprocating two-stroke uniflow internal combustion (IC) cylinder having a cylinder wall and a cylinder head, the cylinder head having an exhaust port, a fuel injector, and a spark plug disposed through the cylinder head, a piston reciprocally mounted in the cylinder for movement alternately through compression and power strokes, and a scroll plenum extending unidirectional around the outside of the cylinder wall and having an inlet and one or more swirl ports disposed through the cylinder wall providing fluid communication from the scroll plenum into the cylinder chamber, wherein the one or more swirl ports enter the cylinder chamber tangentially with respect to the axial centerline of the cylinder, and wherein the one or more swirl ports are subject to opening and closing in response to movement of said piston.

12. The engine of claim 11 wherein the crown of the piston includes a plurality of vanes having elongated sidewalls, extending radially from the center to proximate the edge of the crown.

13. A method for operating a reciprocating two-stroke uniflow multiple cylinder internal combustion (IC) engine including a high pressure supercharger inlet air system and a plurality of cylinders having a cylinder wall and a cylinder head, the cylinder head having an exhaust port, a fuel injector, and a spark ignitor disposed through the cylinder head, a piston reciprocally mounted in the cylinder for movement alternately through compression and power strokes, and a scroll plenum extending unidirectional around the outside of the cylinder wall and having an inlet and one or more swirl ports disposed through the cylinder wall and enter the cylinder chamber tangentially with respect to the axial centerline of the cylinder, and wherein the plurality of swirl ports are subject to opening and closing in response to movement of said piston, the method comprising the steps of:
  a) passing high pressure inlet air through the scroll plenum and uncovered inlet ports and into the cylinder with the piston proximate the bottom of its reciprocal stroke within the cylinder, and swirling the inlet air in tangential turbulent unidirectional flow within the cylinder,
  b) maintaining the exhaust port in an open position while the inlet air ports are uncovered to provide scavenging of the cylinder by the inlet air,
  c) advancing the piston upward to cover the inlet ports,
  d) closing the exhaust port,
  e) compressing the inlet air between the piston and the cylinder head to a compression ratio of about 8:1 to about 12:1,
  f) dispersing a fuel near the end of the compression stroke at a lean burning fuel to air ratio in the range of about 0.2 to about 0.8, the fuel being dispersed in the same tangential direction as the flow of the turbulent, swirling air, to obtain a stratified charge and intimate air-fuel mixing,
  g) igniting and combusting the stratified charge of the air-fuel mixture to initiate the power stroke,
  h) opening the exhaust value near the end of the power stroke to exhaust combustion gases, and
  i) uncovering the inlet ports as the piston approaches the bottom of its power stroke.

14. The method of claim 13, wherein the exhausting combustion gas drives an exhaust gas turbine that powers the supercharger.

15. The method of claim 14, wherein the engine further includes a power turbine, and further includes the step of driving the low pressure exhaust turbine with the exhaust gas from the exhaust gas turbine to power the engine crankshaft.

* * * * *